(12) United States Patent
Cui (10) Patent No.: US 10,807,843 B2
(45) Date of Patent: Oct. 20, 2020

(54) DRIVE FOR ELECTRIC CLUTCH AND WINCH

(71) Applicant: Ningbo Lianda Winch Co., Ltd., Ningbo (CN)

(72) Inventor: Xiaojun Cui, Ningbo (CN)

(*) Notice: Subject to any disclaimer, the term of this patent is extended or adjusted under 35 U.S.C. 154(b) by 119 days.

(21) Appl. No.: 16/168,833

(22) Filed: Oct. 24, 2018

(65) Prior Publication Data
US 2019/0389703 A1 Dec. 26, 2019

(30) Foreign Application Priority Data

Jun. 22, 2018 (CN) .......................... 2018 1 0650387

(51) Int. Cl.
| | |
|---|---|
| *B66D 1/46* | (2006.01) |
| *B66C 1/68* | (2006.01) |
| *B66D 1/12* | (2006.01) |
| *B66D 3/20* | (2006.01) |
| *B66D 1/22* | (2006.01) |
| *B60W 10/08* | (2006.01) |
| *B61D 47/00* | (2006.01) |
| *F16D 23/12* | (2006.01) |

(52) U.S. Cl.
CPC .................. *B66D 1/46* (2013.01); *B66C 1/68* (2013.01); *B66D 1/12* (2013.01); *B66D 1/225* (2013.01); *B66D 3/20* (2013.01); *B60W 10/08* (2013.01); *B61D 47/005* (2013.01); *F16D 2023/123* (2013.01)

(58) Field of Classification Search
CPC ................................................ F16D 2023/126
See application file for complete search history.

(56) References Cited

U.S. PATENT DOCUMENTS

| | | | | |
|---|---|---|---|---|
| 4,884,401 | A * | 12/1989 | Metcalf .................. | F15B 20/00 60/403 |
| 2002/0148699 | A1* | 10/2002 | Mack ...................... | F16D 28/00 192/83 |
| 2004/0187618 | A1* | 9/2004 | Yamamoto ............ | F16H 63/304 74/335 |
| 2011/0113913 | A1* | 5/2011 | Zheng .................... | F16H 61/34 74/473.12 |
| 2017/0159722 | A1* | 6/2017 | Park ....................... | F16D 23/12 |
| 2018/0056782 | A1* | 3/2018 | Lammers ............... | B60K 17/28 |
| 2019/0085976 | A1* | 3/2019 | Gassmann ............ | F16H 63/304 |

FOREIGN PATENT DOCUMENTS

WO WO-2017148501 A1 * 9/2017 ........... F16H 63/304

* cited by examiner

*Primary Examiner* — Timothy Hannon
(74) *Attorney, Agent, or Firm* — W&K IP (57) ABSTRACT

Embodiments of the present disclosure disclose a drive for an electric clutch if a winch. The drive comprises a pusher block having a first end, a second end, and a transmission component arranged on a central portion of the pusher block to drive a transmission shaft; a first driving unit connected to the first end to drive the first end to reciprocate between a first position and a second position; and a second driving unit connected to the second end to drive the second end to reciprocate between a third position and a fourth position. The drive enables switching of the transmission shaft between a high speed mode, a low speed mode, and an idle mode. A winch including the drive is also disclosed.

5 Claims, 10 Drawing Sheets

DRIVE FOR ELECTRIC CLUTCH AND WINCH

CROSS-REFERENCE TO RELATED APPLICATIONS

This application claims priority to Chinese Patent Application No. 201810650387.3a filing date of Jun. 22, 2018. The content of the aforementioned applications, including any intervening amendments thereto, are incorporated herein by reference.

TECHNICAL FIELD

The present application relates to the field of winches, and more particularly, to an electric clutch mechanism for winches.

BACKGROUND

The winch is a traction device commonly used for clearing obstacles, towing items, and installing facilities. It is widely used in off-road automobiles, agricultural vehicles, yachts, fire rescue vehicles, road wreckers, and other special-purpose vehicles.

A winch in the prior arts is generally a single-speed winch. The winch may have a limited field of application and prove difficult for operation of the multi-speed traction modes. Therefore, engineers have devised a two-speed winch, for example, an electric two-speed winch having a high speed mode, a low gear mode and a disengaged mode. The change of modes for the electric two-speed winch is achieved through changing the position of the transmission shaft. To complete the switching between the high speed mode, the low speed mode and the disengaged mode, the driving mechanism needs to drive the transmission shaft to switch between three different positions. The driving mechanism is relatively complicated and generally requires to be manually driven. Therefore, it is still needed to develop a simple and reliable electric drive mechanism for the winch.

SUMMARY

It is an objective of the present disclosure to solve some of the problems of the prior arts by providing a drive for an electric clutch comprising a pusher block having a first end, a second end, and a transmission component arranged on a central portion of the pusher block to drive a transmission shaft; a first driving unit connected to the first end to drive the first end to reciprocate between a first position and a second position; and a second driving unit connected to the second end to drive the second end to reciprocate between a third position and a fourth position.

In an embodiment, the drive further comprises a mounting plate fixedly connected to the first driving unit and the second driving unit.

In an embodiment, the drive further comprises a holder which is fixed to the mounting plate and includes a limiting component to contain the pusher block.

In an embodiment, a guiding component is arranged on the side walls of the pusher block and the limiting component.

In an embodiment, the guiding component comprises a guiding slot arranged on the side wall of the limiting component and a guiding pin arranged on the side of the pusher block, and the guiding pin is slidably connected in the guiding slot.

In an embodiment, the holder comprises two L-shaped plates, the horizontal sides of the two L-shaped plates are fixedly connected with the mounting plate, the vertical sides of the two L-shaped plates form the limit component, two guiding slots are disposed on the side walls of the vertical sides of the two L-shaped plates, a connecting plate is arranged on top of the vertical sides of the two L-shaped plates, the connecting plate comprises a retaining port for the transmission shaft to pass, two retaining holes are arranged on the sides of the horizontal sides of the two L-shaped plates for the guiding pin to pass, and the retaining holes are incorporated into the guiding slots.

In an embodiment, at least one of the first driving unit and the second driving unit comprises a motor and a driving block. The driving block is fixedly connected to a rotating shaft of the motor and comprises a spiral sliding surface. At least one of the first end and the second end contacts the spiral sliding surface.

In an embodiment, a limiting block is arranged between a bottom end and a top end of the spiral sliding surface. A first side surface of the limiting block forms a top limiting surface which defines a topmost position the first end or the second end reaches. A second side surface of the limiting block forms a bottom limiting surface which defines a bottommost position the first end or the second end reaches.

In an embodiment, a winch comprises a housing which includes an electric clutch drive comprising a pusher block having a first end, a second end, and a transmission component arranged on a central portion of the pusher block to drive a transmission shaft; a first driving unit connected to the first end to drive the first end to reciprocate between a first position and a second position; a second driving unit connected to the second end to drive the second end to reciprocate between a third position and a fourth position; and a switch component arranged on an end of the housing to control the first driving unit and the second driving unit.

In an embodiment, the switch component comprises a first switch, a second switch, and a third switch. The first switch, the second switch, and the third switch are electrically coupled to the first driving unit and the second driving unit.

The following advantages are achieved through the structure described above: The first position may be a nearest position on the route of the first driving unit. The second position may be a farthest position on the route of the first driving unit. The third position may be a nearest position on the route of the second driving unit. The fourth position may be a farthest position on the route of the second driving unit. When the first driving unit drives the first end to the first position and the second driving unit drives the second end to the third position, the transmission component on the middle of the pusher block is at the nearest position to the first driving unit and the second driving unit.

When the first driving unit drives the first end to the second position and the second driving unit drives the second end to the fourth position, the transmission component on the middle of the pusher block is at the farthest position from the first driving unit and the second driving unit.

When the first driving unit drives the first end to the second position and the second driving unit drives the second end to the third position, or when the first driving unit drives the first end to the first position and the second driving unit drives the second end to the fourth position, the transmission component on the middle of the pusher block is positioned between the nearest position and the farthest position, i.e., at a middle position.

The transmission component can be moved to three different positions by driving the first end with the first driving unit and driving the second end with the second driving unit. When used in an electric clutch, the transmission shaft connected to the transmission component can switch between three states which correspond to a disengaged state, a first operation state, and a second operation state. A clutch mechanism with a handy structure and a reliable performance can be therefore achieved.

REFERENCE NUMBERS 1 pusher block;
1.1 first end;
1.2 second end;
2 transmission shaft;
3 transmission component;
4 first driving unit;
5 second driving unit;
6 mounting plate;
7 holder;
8 limiting component;
9 guiding slots;
10 guiding pin;
11 L-shaped plate;
12 connecting plate;
13 retaining port;
14 retaining holes;
15 motor;
16 driving block;
17 spiral sliding surface;
18 limiting block;
19 top limiting surface;
20 bottom limiting surface;
24 housing;
21 first stage planetary gear component;
22 second stage planetary gear component;
23 third stage planetary gear component;
25 spline;
26 gear lever;
27 first gear hole;
28 second gear hole;
29 third gear hole;
30 first switch;
31 second switch;
32 third switch;
101 first position;
102 second position;
103 third position;
104 fourth position.

DETAILED DESCRIPTION

Exemplary embodiments are provided such that the disclosure will be thorough, and will fully convey the scope to those who skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The skilled in the art will be understand that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items. The terms "connected", "coupled" may mean any electric or mechanical connection, either direct or indirect, between two or more elements.

As shown in FIGS. 1-8, a winch according to an embodiment comprises a housing 24 which includes a first-stage planetary gear component 21, a secondary planetary gear component 22, and a three-stage planetary gear component 23. The housing 24 further comprises a transmission shaft 2, and the transmission shaft 2 comprises a spline 25. The transmission shaft 2 may change positions along an axial direction. The transmission shaft 2 has three working modes. When the position of the transmission shaft 2 is changed, the first stage planetary gear component 21 and the secondary planetary gear component 22 can be driven by the spline 25 to provide a high-speed rotation mode, or the first stage planetary gear component 21 and the third stage planetary gear component 23 may be driven by the spline 25 to provide a low-speed rotation mode, or the spline 25 may be disengaged from the first stage planetary gear component 21 to provide an idle mode.

One end of the transmission shaft 2 is connected to the drive of the electric clutch, and the transmission shaft 2 is driven by the drive of the electric clutch. The transmission shaft 2 is connected with an elastic component for abutting drive of the electric clutch so that the transmission shaft 2 may stay in close contact with the drive of the electric clutch.

The drive for the electric clutch comprises a pusher block 1 having a first end 1.1 and a second end 1.2. A transmission component 3 is arranged on a central portion of the pusher block 1 to drive a transmission shaft 2. A first driving unit 4 is connected to the first end 1.1 to drive the first end 1.1 to reciprocate between a first position 101 and a second position 102. A second driving unit 5 is connected to the second end 1.2 to drive the second end 1.2 to reciprocate between a third position 103 and a fourth position 104.

Figure 2:
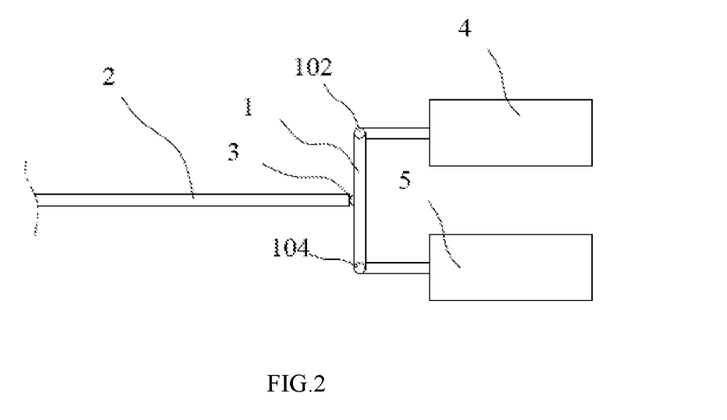
FIG. 2 illustrates an embodiment of the present disclosure where a drive of the electric clutch drives the transmission shaft to a first state.

The first position 101 may specifically refer to the nearest position on the route of the first driving unit 4. The second position 102 may be the farthest position on the route of the first driving unit 4. The third position 103 may be the nearest position on the route of the second driving unit 5. The fourth position 104 may be the farthest position on the route of the second driving unit 5. The embodiment enables the pusher block 1 to operate in the following states:

In a first state as shown in FIG. 2, the transmission shaft 3 would be located at the farthest position from the first driving unit 4 and the second driving unit 5 when the first driving unit 4 drives the first end 1.1 to the second position 102 and the second driving unit 5 drives the second end 1.2 to the fourth position 104.

Figure 3:
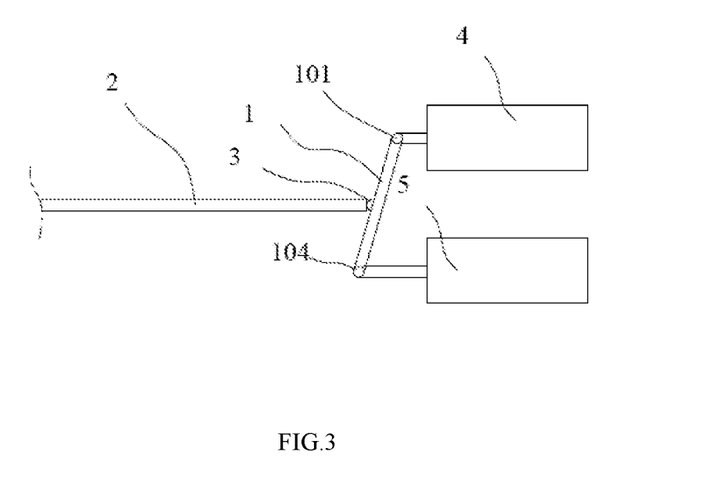
FIG. 3 illustrates an embodiment of the present disclosure where a drive of the electric clutch drives the transmission shaft to a second state.
Figure 4:
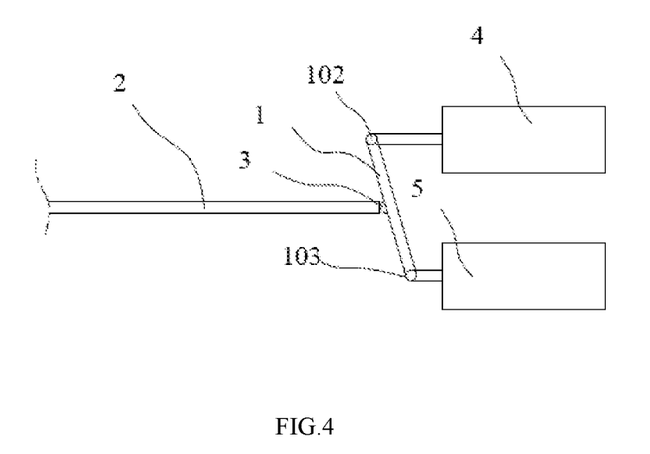
FIG. 4 illustrates another embodiment of the present disclosure where a drive of the electric clutch drives the transmission shaft to a second state.

In a second state as shown in FIGS. 3-4, the transmission shaft 3 would be located at a position between the farthest position and the nearest position, i.e., at a middle position, when the first driving unit 4 drives the first end 1.1 to the second position 102 and the second driving unit 5 drives the second end 1.2 to the third position 103, or when the first driving unit 4 drives the first end 1.1 to the first position 101 and the second driving unit 5 drives the second 1.2 to the fourth position 104.

Figure 5:
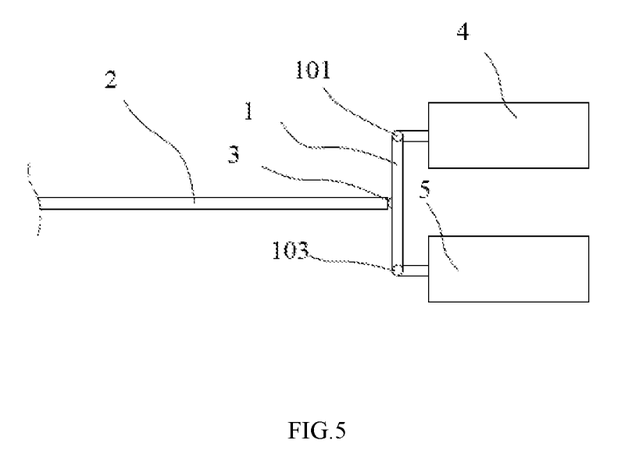
FIG. 5 illustrates an embodiment of the present disclosure where a drive of the electric clutch drives the transmission shaft to a third state.

In a third state as shown in FIG. 5, the transmission shaft 3 would be located at the nearest position to the first driving unit 4 and the second driving unit 5 when the first driving unit 4 drives the first end 1.1 to the first position 101 and the second driving unit 5 drives the second end 1.2 to the third position 103.

That is to say, the transmission component 3 can be changed to three different positions by using the first driving unit 4 to change the position of the first end 1.1 and using the first second unit 5 to change the position of the second end 1.2. When used in an electric clutch in which the transmission component 3 is connected to the transmission shaft 2, the transmission shaft 2 can be changed to three different states as well. The first state may correspond to the high-speed mode of the transmission shaft 2. The second state may correspond to the disengaged mode, i.e., the idle mode, of the transmission shaft 2. The third state may correspond to the low-speed mode of the transmission shaft 2. The engagement and disengagement of the transmission shaft 2 can be achieved through such a configuration.

The transmission component 3 can be specifically a plane or a groove so long as it can be connected or contacting with the transmission shaft 2 to transmit a driving force to push the transmission shaft 2. In one embodiment, the transmission component 3 is a bump having an arched surface. The arched surface allows a smooth contact between the transmission component 3 and the transmission shaft 2 as the angular position of the transmission component 3 changes. The surface of the bump can also be complanate. The transmission shaft 2 may abut the transmission component 3 or hinge to the transmission component 3.

The first driving unit 4 is fixed relatively to the second driving unit 5. For example, the first driving unit 4 and the second driving unit 5 may be fixed on the same bracket or different brackets so long as the first driving unit 4 can drive the first end 1.1 to switch between the first position 101 and the second position 102 and the second driving unit 5 can drive the second end 1.2 to switch between the third position 103 and the fourth position 104. A mounting plate 6 can be comprised in the drive for the electric clutch. Both the first driving unit 4 and the second driving unit 5 can be fixed connected to the mounting plate 6. In this way, the mounting plate 6 can be used to fix the first driving unit 4 and the second driving unit 5 in a more stable manner. For example, the first driving unit 4 and the second driving unit 5 can be both fixed on the same side of the mounting plate 6. The first driving unit 4 and the second driving unit 5 can also be fixed on different sides of the mounting plate 6 if a transmission structures is provided.

The drive for the electric clutch further includes a holder 7 having a limiting component 8. The pusher block 1 is arranged within the limiting component 8. As the motion of the two ends of the pusher block 1 causes the pusher block 1 to move, the limiting component 8 can be used to limit the movement of the pusher block 1 and avoids detachment of the pusher block 1.

The holder 7 is to be fixed. For example, the holder 7 can be fixed on a part of the winch, as long as the pusher block 1 can be located in the limiting card slot 8. In an embodiment, the holder 7 is fixedly connected to the mounting plate 6. In this way, the holder 7, the first driving unit 4 and the second driving unit 5 are all fixed on the mounting plate 6, which can be structurally stable, compact and space-saving.

A guiding structure is disposed on the sidewalls of the pusher block 1 and the limiting component 8. The guiding structure comprises a guiding slot 9 provided on the side wall of the limiting component 8 and a guiding pin 10 disposed on the side of the pusher block 1, and the guiding pin 10 is slidably connected with the guiding groove 9. The direction of the guiding groove 9 coincides with the moving direction of the transmission component 3. The cooperation of the guiding pin 10 and the guiding groove 9 enables the transmission component 3 to travel a consistent trajectory when the transmission shaft 2 is pushed to perform gear shifting, thereby further ensuring a robust operation.

Figure 6:
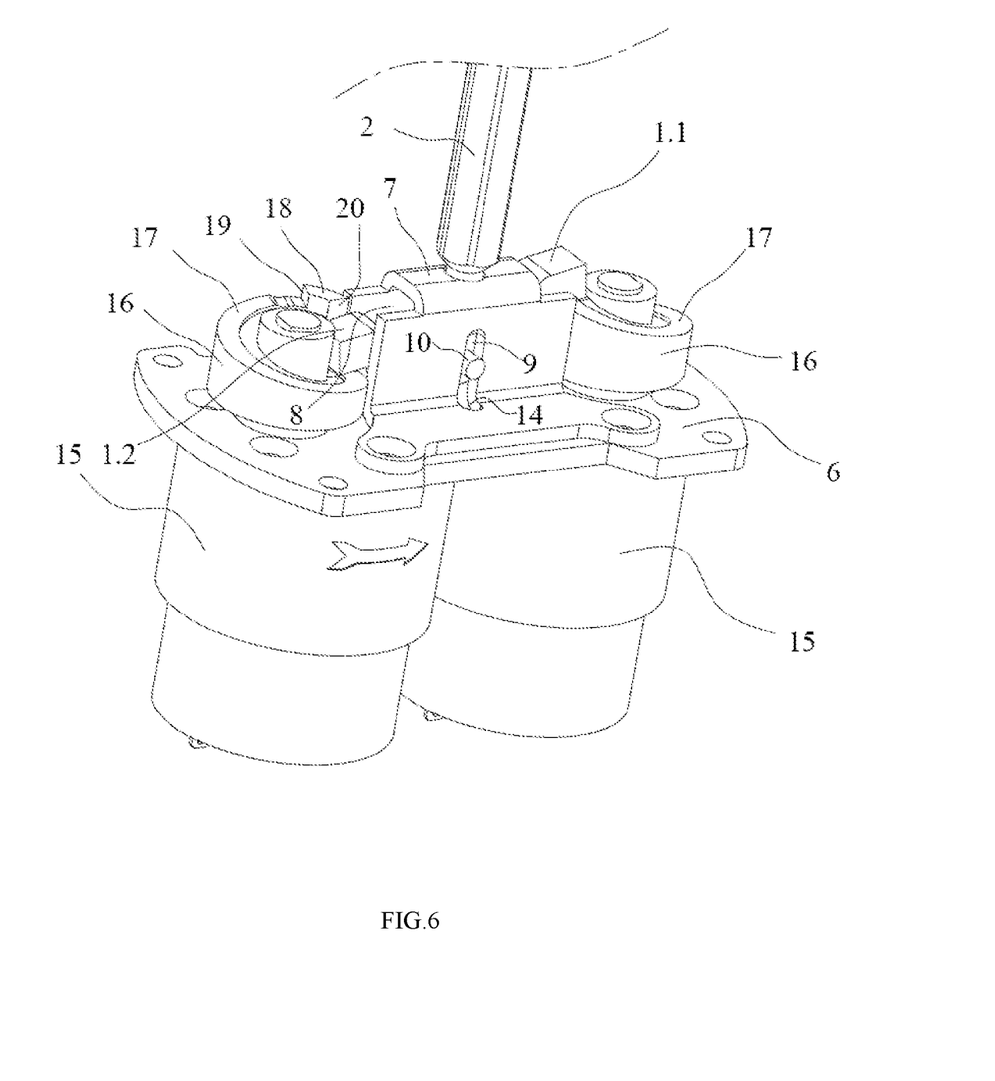
FIG. 6 illustrates the structures of the drive of the electric clutch of an embodiment of the present disclosure.
Figure 7:
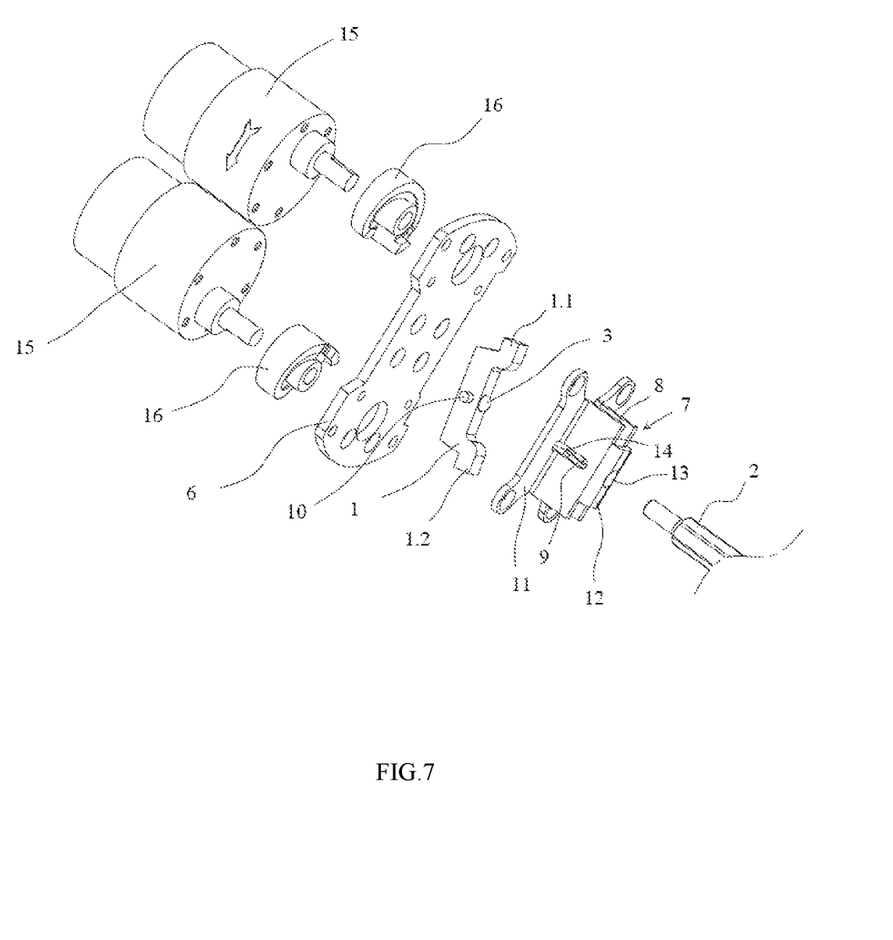
FIG. 7 illustrates an explosive view of the drive of the electric clutch of an embodiment of the present disclosure.

As shown in FIGS. 6-7, the holder 7 comprises two L-shaped plates 11. The horizontal sides of the two L-shaped plates 11 are fixed connected to the mounting plate 6. The vertical sides of the two L-shaped plates 11 form the limiting component 8. Two guiding slots 9 are disposed on the side walls of the vertical sides of the two L-shaped plates 11. A connecting plate 12 is arranged on top of the vertical sides of the two L-shaped plates 11. The connecting plate 12 comprises a retaining port 13 for the transmission shaft 2 to pass. The two L-shaped plates 11 and the connecting plate 12 are stamped together. A more compact holder 7 is allowed by using the described structures.

The pusher block 1 can be prevented from detaching from the limiting component 8 by the mounting plate 6, the two L-shaped plates 11, and the connecting plate 12. On one hand, the retaining port 13 can give way to the transmission shaft 2, so that the transmission shaft 2 can be in contact with the transmission component 3. On the other hand, the retaining port 13 guides the transmission shaft 2 to avoid deviation during mode switching of the transmission shaft 2.

Two retaining holes 14 are arranged on the sides of the horizontal sides of the two L-shaped plates 11 for the guiding pin 10 to pass, and the retaining holes 14 are incorporated into the guiding slots 9. In this way, the guiding pins 10 can be guided into the guiding slots 9 through the retaining holes 14.

At least one of the first driving unit 4 and the second driving unit 5 is an electric push rod. The driving end of the electric push rod is hinged to a first end 1.1 and a second end 1.2. In another embodiment, at least one of the first driving unit 4 and the second driving unit 5 comprises a motor 15 and a driving block 16. The driving block 16 is fixedly connected to a rotating shaft of the motor 15 and comprises a spiral sliding surface 17. At least one of the first end 1.1 and the second end 1.2 contacts the spiral sliding surface 17.

Figure 1:
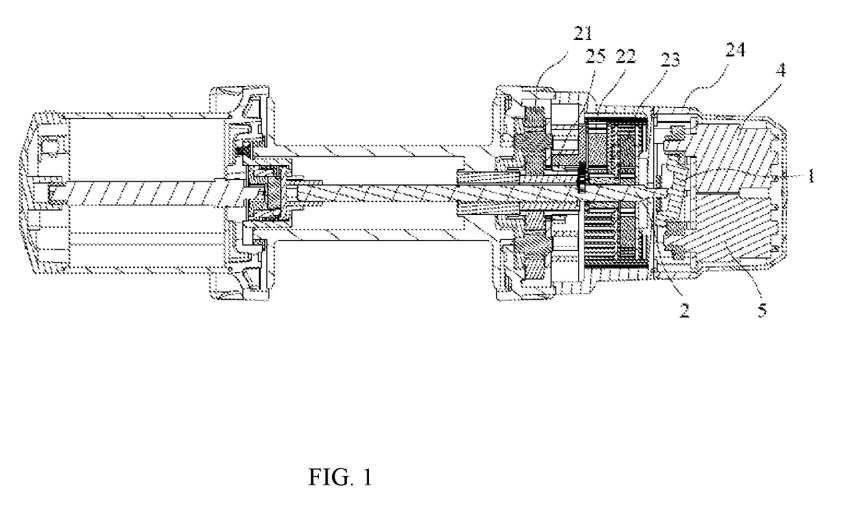
FIG. 1 is a cross-sectional view of an embodiment of the present disclosure.

As shown in FIGS. 1, 6, and 7, both the first driving unit 4 and the second driving unit 5 may be electric push rods. It is also possible that the first drive unit 4 and the second drive unit 5 comprise a motor 15 and a driving block 16. Specific combinations can be anticipated by those skilled in the art as the case may be.

A limiting block 18 is positioned between the bottom and the top of the spiral sliding surface 17. A first side surface of the limiting block 18 forms a top limiting surface 19 which defines the topmost position the first end 1.1 or the second end 1.2 may reach. A second side surface of the limiting block 18 forms a bottom limiting surface 20 which defines a bottommost position the first end 1.1 or the second end 1.2 may reach.

Figure 8:
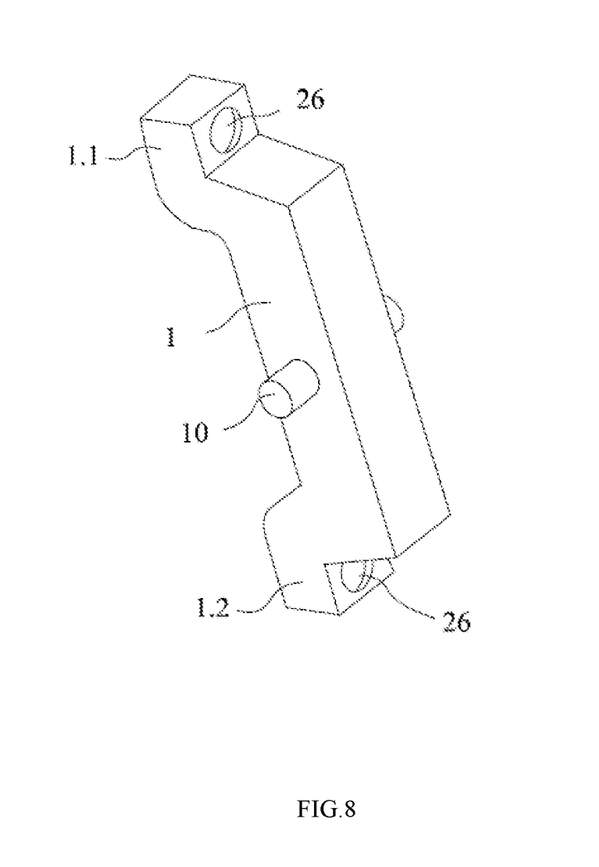
FIG. 8 illustrates a pusher block of the drive of the electric clutch of an embodiment of the present disclosure.

As shown in FIG. 8, an arched protrusion is provided on a side of the first end 1.1 or the second end 1.2 facing the spiral sliding surface 17. The arched protrusion enables an unhindered movement of the first end 1.1 or the second end 1.2 relative to the spiral sliding surface 17. The axial lines of the first driving unit 4 and the second driving unit 5 can be parallel to each other.

In an embodiment, a line connecting the first position 101 and the second position 102 is a first trajectory line. A line connecting the third position 103 and the fourth position 104 is a second trajectory line. The first trajectory line can be parallel to the second trajectory line.

In an embodiment, the distance between the first position 101 and the second position 102 is equal to the distance between the third position 103 and the fourth position 104. The projections of the first position 101 and the third position 103 on the axis of the transmission shaft 2 are at the same point. The projections of the second position 102 and the fourth position 104 on the axis of the transmission shaft 2 are at the same point.

In one embodiment, the first trajectory line, the second trajectory line, the axial line of the first driving unit 4, and the axial line of the second driving unit 5 are parallel to each other.

Figure 9:
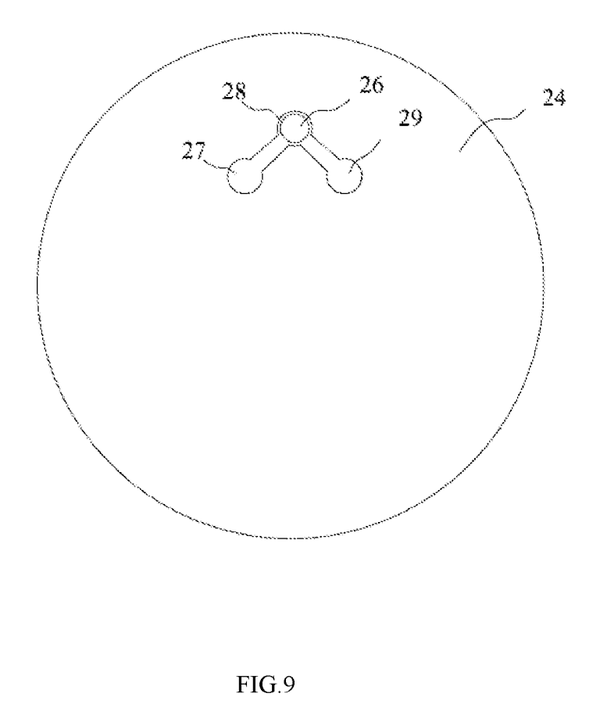
FIG. 9 illustrates an embodiment where a switch component on the end of housing comprises a gear lever.
Figure 10:
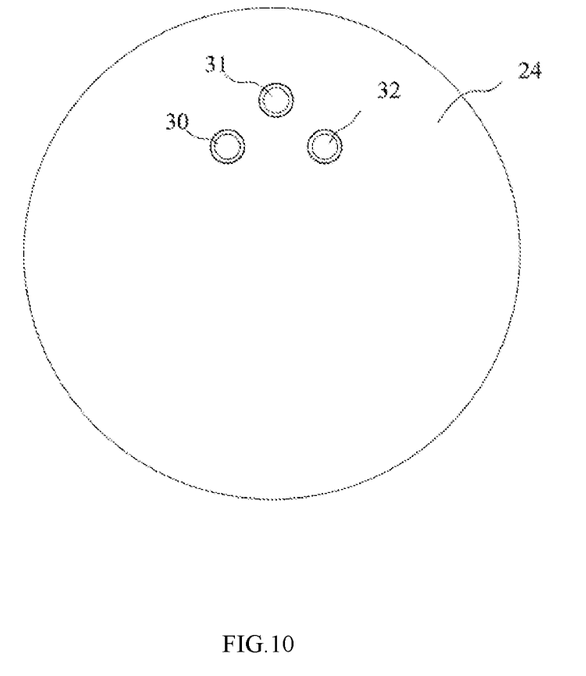
FIG. 10 illustrates an embodiment where a switch component on the end of housing comprises a first switch, a second switch, and a third switch.

The end of the housing 24 is provided with a switch component that controls the first driving unit 4 and the second driving unit 5. As shown in FIG. 9, the switch component may specifically include a gear lever 26. The end of the housing 24 comprises a first gear hole 27, a second gear hole 28 and a third gear hole 29. The position of the gear lever may be changed between the first gear hole 27, the second gear hole 28, and the third gear hole 29.

The following correspondence between the gear holes and the operation modes may be utilized:
1. The first gear hole 27 can correspond to the low speed mode, the second gear hole 28 can correspond to the high speed mode, and the third gear hole 29 can correspond to the idle mode;
2. The first gear hole 27 can correspond to the low speed mode, the second gear hole 28 can correspond to the idle mode, and the third gear hole 29 can correspond to the high speed mode;
3. The first gear hole 27 can correspond to the idle mode, the second gear hole 28 can correspond to the low speed mode, and the third gear hole 29 can correspond to the high speed mode;
4. The first gear hole 27 can correspond to the idle mode, the second gear hole 28 can correspond to the high speed mode, and the third gear hole 29 can correspond to the low speed mode;
5. The first gear hole 27 can correspond to the high speed mode, the second gear hole 28 can correspond to the idle mode, and the third gear hole 29 can correspond to the low speed mode;
6. The first gear hole 27 can correspond to the high speed mode, the second gear hole 28 can correspond to the low speed mode, and the third gear hole 29 can correspond to the idle mode.

The foregoing description of the embodiments has been provided for purposes of illustration and description. It is not intended to be exhaustive or to limit the disclosure. Variations or modifications of the embodiments are not to be regarded as a departure from the disclosure, and all such modifications are intended to be included within the scope of the disclosure.

I claim:
1. A drive for an electric clutch, comprising:
a pusher block having a first end, a second end, and a transmission component arranged on a central portion of the pusher block to drive a transmission shaft;
a first driving unit connected to the first end to drive the first end to reciprocate between a first position and a second position; and
a second driving unit connected to the second end to drive the second end to reciprocate between a third position and a fourth position;
a mounting plate fixedly connected to the first driving unit and the second driving unit;
a holder which is fixed to the mounting plate and includes a limiting component to contain the pusher block;
wherein a guiding component is arranged on side walls of the pusher block and the limiting component.
2. The drive of claim 1, wherein the guiding component comprises a guiding slot arranged on the side wall of the limiting component and a guiding pin arranged on the side of the pusher block, and wherein the guiding pin is slidably connected in the guiding slot.
3. The drive of claim 2, wherein the holder comprises two L-shaped plates, horizontal sides of the two L-shaped plates are fixedly connected with the mounting plate, vertical sides of the two L-shaped plates form a limit component, the two guiding slots are disposed on the side walls of the vertical sides of the two L-shaped plates, a connecting plate is arranged on top of the vertical sides of the two L-shaped plates, the connecting plate comprises a retaining port for the transmission shaft to pass, two retaining holes are arranged on the sides of the horizontal sides of the two L-shaped plates for the guiding pin to pass, and the retaining holes are incorporated into the guiding slots.
4. The drive of claim 1, wherein at least one of the first driving unit and the second driving unit comprises a motor and a driving block, wherein the driving block is fixedly connected to a rotating shaft of the motor and comprises a spiral sliding surface, and wherein at least one of the first end and the second end contacts the spiral sliding surface.
5. The drive of claim 4, wherein a limiting block is arranged between a bottom end and a top end of the spiral sliding surface, wherein a first side surface of the limiting block forms a top limiting surface which defines a topmost position the first end or the second end reaches, and wherein a second side surface of the limiting block forms a bottom limiting surface which defines a bottommost position the first end or the second end reaches.

* * * * *